(12) United States Patent  
Arnold

(10) Patent No.: US 8,585,353 B2
(45) Date of Patent: Nov. 19, 2013

(54) VARIABLE VOLUTE TURBINE

(76) Inventor: Steven Don Arnold, Rancho Palos Verdes, CA (US)

( * ) Notice: Subject to any disclaimer, the term of this patent is extended or adjusted under 35 U.S.C. 154(b) by 708 days.

(21) Appl. No.: 12/871,151

(22) Filed: Aug. 30, 2010

(65) Prior Publication Data

US 2011/0052374 A1 Mar. 3, 2011

Related U.S. Application Data

(60) Provisional application No. 61/238,593, filed on Aug. 31, 2009.

(51) Int. Cl.
*F01B 25/02* (2006.01)

(52) U.S. Cl.
USPC ............ 415/128; 415/156; 415/197; 415/203

(58) Field of Classification Search
USPC ......... 415/126, 128, 151, 156, 196, 197, 203, 415/204, 205, 206
See application file for complete search history.

(56) References Cited

U.S. PATENT DOCUMENTS

| | | | |
|---|---|---|---|
| 4,179,247 A | 12/1979 | Osborn | |
| 4,499,732 A | 2/1985 | Szczupak | |
| 4,512,716 A | 4/1985 | McHenry | |
| 4,726,744 A | 2/1988 | Arnold | |
| 4,729,715 A | 3/1988 | Wilde | |
| 4,867,637 A | 9/1989 | Hayama | |
| 6,134,889 A | 10/2000 | Markyvech et al. | |
| 6,158,956 A | 12/2000 | Arnold | |
| 6,269,642 B1 | 8/2001 | Arnold et al. | |
| 6,419,464 B1 | 7/2002 | Arnold | |
| 6,599,087 B2 | 7/2003 | Arnold | |
| 6,637,205 B1 | 10/2003 | Ahmad et al. | |
| 6,665,604 B2 | 12/2003 | Arnold | |
| 6,672,059 B2 | 1/2004 | Arnold | |
| 6,679,057 B2 | 1/2004 | Arnold | |
| 6,681,573 B2 | 1/2004 | Arnold | |
| 6,694,733 B1 | 2/2004 | Bernardini et al. | |
| 6,729,134 B2 | 5/2004 | Arnold et al. | |
| 6,928,818 B1 | 8/2005 | Arnold et al. | |
| 6,948,907 B2 | 9/2005 | Vogiatzis et al. | |
| 6,996,986 B2 | 2/2006 | Arnold | |
| 7,476,082 B2 | 1/2009 | Vogiatzis et al. | |
| 2005/0160731 A1* | 7/2005 | Arnold et al. ................... 60/602 |
| 2009/0179426 A1 | 7/2009 | Alvarez et al. | |

FOREIGN PATENT DOCUMENTS

JP 57024403 A 9/1982
KR 10-2007-0043599 A 4/2007

* cited by examiner

Primary Examiner — Igor Kershteyn
(74) Attorney, Agent, or Firm — Felix L. Fishcer

(57) ABSTRACT

A variable inlet area turbine employs a volute with a discharge area for flow of exhaust gas carried in the volute into a turbine inlet area. A flexible dividing wall having an end is movable along a path defined adjacent the turbine inlet area and transitioning in a smooth curve into an outer wall of the volute. The dividing wall is selectively positionable by insertion and withdrawal along the path to vary the discharge area from substantially closed to substantially open.

20 Claims, 17 Drawing Sheets

VARIABLE VOLUTE TURBINE

REFERENCE TO RELATED APPLICATIONS

This application relies on the priority of provisional application Ser. No. 61/238,593 filed on Aug. 30, 2009 entitled Variable Volute Turbine having a common inventor with the present application.

BACKGROUND OF THE INVENTION

1. Field of the Invention

This invention relates generally to the field of turbochargers for internal combustion engines and more particularly to a turbocharger turbine volute having a flexible dividing wall defining and controlling the throat section of the volute at the end of the flexible wall with the wall movable to alter the end position, thus reducing the area and percentage of the periphery of the volute that is discharging flow into the turbine wheel.

2. Description of the Related Art

Turbochargers are employed on numerous forms of internal combustion engines for use in automobiles and other vehicles. Turbochargers typically employ a radial turbine operating with an inlet volute supplying exhaust gas from the engine to power a compressor for inlet charge to the engine. Controlling the turbine to achieve desired power in the turbocharger is often required. The purpose of a variable geometry turbine is to be able to actuate some movable mechanism such that it results in a controllable variable turbine power output. On the corrected flow curve shown in FIG. 1, assuming a constant physical flow, closing the vanes of a conventional variable nozzle turbine moves the operating point to a lower corrected flow and a higher expansion ratio, thus producing more power.

The problems and limitations of variable geometry turbines are well known and there is a continual search for a better mechanism to overcome these problems. Turbines with fixed and variable nozzle vanes are the standard in many industrial applications—aero gas turbines, industrial gas turbines, turbo-expanders, steam turbines, etc. Fixed nozzle vanes have not traditionally been standard in turbochargers due to narrow operating range, vibration-induced fatigue failures of the turbine wheels, and noise generated by the turbine blades passing the nozzle vanes.

The reason for the success of nozzles in traditional applications and the relative lack of success in turbochargers is that turbocharger turbines operate over an extremely wide speed range, generally at least 10/1. In most industrial turbine applications, the turbine speed range is usually very limited (~2 or 3/1). Resonances between the vibration-inducing nozzles and the natural vibrational modes of the turbine wheel can be tolerated in most industrial applications if the turbine operates in resonance for only a few seconds during start-up and shut-down. The wide speed range of the turbocharger makes it exceptionally difficult for the designer to push these resonances either above the maximum speed or below the band of normal operation.

As the vanes in a conventional vaned variable geometry turbine are closed down, the expansion through the vanes reaches the critical point where the flow goes supersonic and shocks are established downstream. As each passage creates its own shock (or multiple shocks) each turbine blade cuts through hundreds or thousands of shocks per second. If the frequency of this shock cutting coincides with a vibrational mode of the turbine wheel, the turbine wheel can fail in just a few minutes. The turbine wheel has many blade and hub modes, and orders of vibration must be accounted for as well so it is quite a complex problem. Even "clusters" of computers running the most sophisticated computational fluid dynamics linked with finite element stress and vibration analysis with auto-optimization routines have difficulty converging on a solution.

As the need for more control over the boost and back-pressure of internal combustion engines has increased, variable geometry turbines have become prevalent in modern engines. Unfortunately, this has resulted in many field issues due to blade vibration failures and has restricted the design latitude for the turbine designer such that there may not be a solution or the solution has severe consequences—poor aerodynamics or high inertia.

While a number of variable geometry turbines have been invented that have no nozzle vanes, they are not commonly used since the performance over the complete operating range is usually lacking. The performance of the variable geometry turbine in a turbocharger is of utmost importance to the engine designer. Turbochargers have a well-known characteristic of poor performance at low engine speeds and of delay or lag in responding to up-power transients. The inertia of the rotor group is commonly identified as the responsible design element. However, the major contributor is the efficiency of the variable geometry turbine at low engine speeds with the vanes operated quite far closed.

FIG. 2, reconstructed from Neil Watson and Marian Janota's, "Turbocharging the Internal Combustion Engine" published by The MacMillan Press Ltd. 1982 shows the classic graph of radial turbine efficiency versus the ratio of the turbine speed U and the isentropic gas velocity C. Fundamentally, this graph shows the limitations of a radial turbine operating at low engine speed. The U/Co is quite low in this operating condition and when an up-power engine transient is executed, the vanes are closed further. This drives up the gas velocity while the turbine speed remains low. The U/Co parameter is often driven down to 0.3 in steady state or below 0.2 in transient operation which results in extremely low turbine efficiency and thus poor response.

A massive amount of work by turbocharger engineers over the years has gone into trying to fix this issue. Unfortunately, it is controlled by the basic physics of the radial turbine. Therefore, another objective of this variable geometry turbine design is to find a "loophole" in the basic physics of the radial turbine to improve the efficiency of the turbine at low blade speed ratios.

FIG. 3 is a generic graph which shows the typical characteristics a vaned variable geometry turbine. Observing the characteristics of the efficiency islands, one can notice that the peak efficiency occurs at a fixed corrected flow. An inference can be drawn from this data that high efficiency is achieved when each blade passage has an ideal corrected flow rate. To achieve high efficiency at low flow rates, an obvious solution would be to use a smaller turbine. Making a variable-sized turbine wheel is impractical as the turbine wheel rotates at up to 500 meters per second tip speed.

It is therefore desirable to eliminate failures of turbine wheels due to vibration induced from the variable mechanism. It is further desirable to enhance the performance of the turbine at low speed-to-gas-velocity (U/Co) ratios. It is additionally desirable to reduce noise as a corollary effect of reducing the turbine wheel failures.

Many fixed geometry turbochargers use divided turbine housings where the exhaust from the cylinders is ducted into two (or more) passages and the exhaust from these groups is kept separate until the turbine wheel entrance. The purpose of this is to take advantage of "pulse charging" and to improve the scavenging of cylinders by preventing high pressure pulses traveling upstream in adjacent cylinders. Conventional variable geometry turbines cannot take advantage of "pulse charging" as the restriction of the vanes create an upstream backpressure which reduces the pulse and geometrical limitations prevent meriodonal separation of the flows through the vanes. It is therefore further desirable to remove the limitation on effectively using "pulse charging" with a variable geometry turbine.

SUMMARY OF THE INVENTION

The embodiments of the present application describe a variable inlet area turbine having a volute with a discharge area for flow of exhaust gas carried in the volute into a turbine inlet area. A flexible dividing wall having an end is movable along a path defined adjacent the turbine inlet area and transitioning in a smooth curve into an outer wall of the volute. The dividing wall is selectively positionable by insertion and withdrawal along the path to vary the discharge area from substantially closed to substantially open.

In a first embodiment, the flexible dividing wall is a link train which rides in a track circumscribing the path. In a second embodiment, the flexible dividing wall is a flexible band carried on a double disk assembly surrounding the turbine inlet area and progressively withdrawing into a slot on an outer wall of the volute to open the volute discharge area through the double disk assembly

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The embodiments described herein employ only a portion of the turbine wheel by admitting flow not to the entire 360 degree periphery of the wheel, but only a portion of the wheel surrounded by the volute. There will be some loss associated with times of zero flow through the blade passages, but this may be small compared to the high efficiency of the total flow. In addition if the flow is concentrated into one passage rather than being divided up into many small passages with extreme velocity, the flow friction loss will be substantially lower. Traditionally, a turbine volute starts with a design throat section at 0 degrees which decreases to zero area as it transitions to 360 degrees. According to the law of conservation of momentum, the throat area (A) divided by the radius of the centroid of the area (r) controls the flow vector into the wheel. There are many variable geometry turbine designs with moving flaps or levers that attempt to change the throat section in a limited way. The embodiments disclosed herein provide a method of smoothly and continuously changing the A/r and the percentage of the volute discharging to the wheel and achieving a very high area turndown (ratio of maximum discharge area to minimum discharge area). An embodiment could be designed to go completely closed and achieve a turndown ratio of infinity, however in practice exemplary embodiments will have a turndown ratio of between 10/1 and 20/1.

Figure 1:
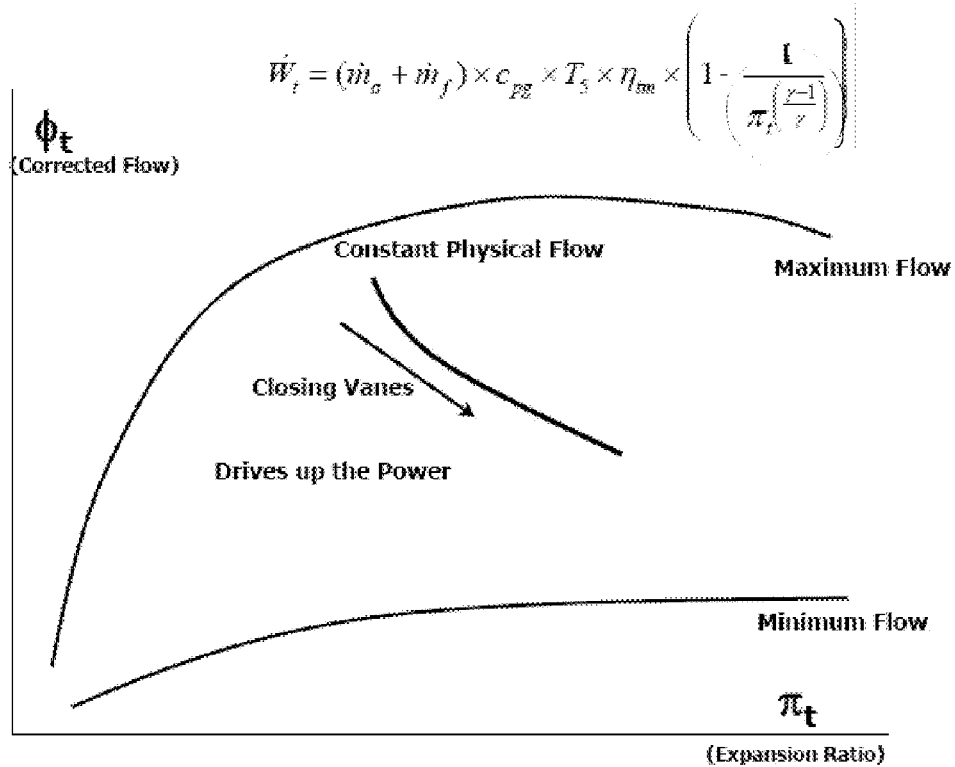
FIG. 1 is graph of corrected flow and expansion ratio for a turbine having a variable geometry nozzle.
Figure 2:
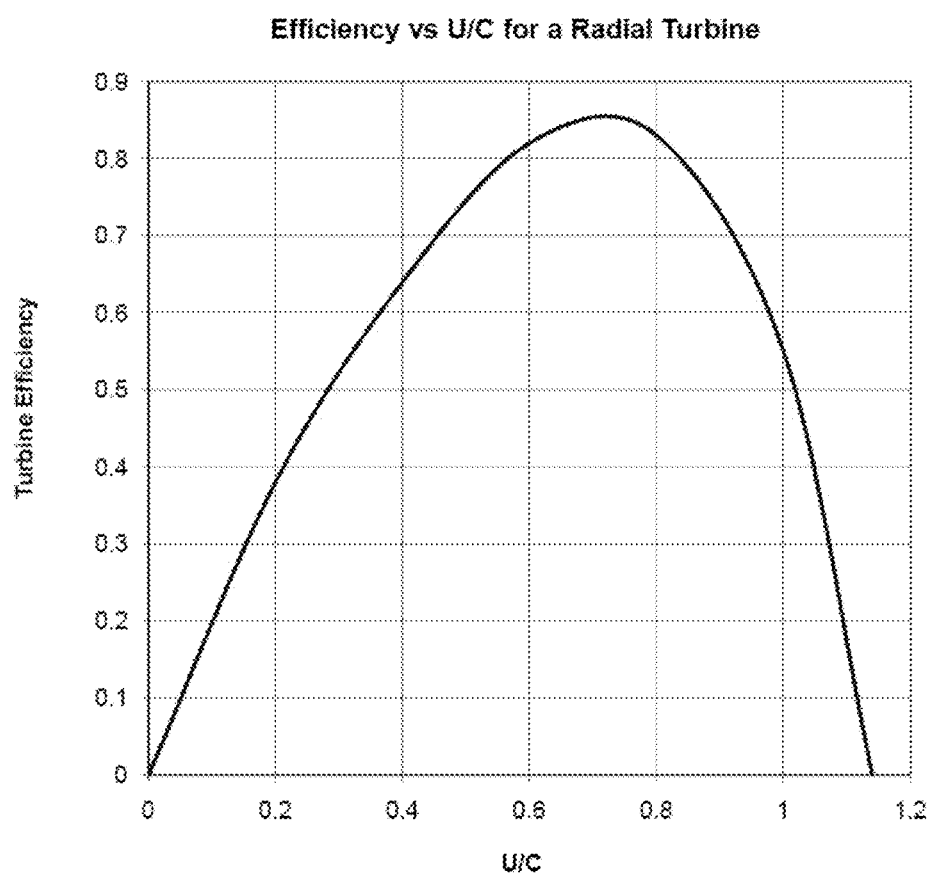
FIG. 2 is a graph of efficiency with respect to a ratio of turbine speed and the isoentropic gas velocity.
Figure 3:
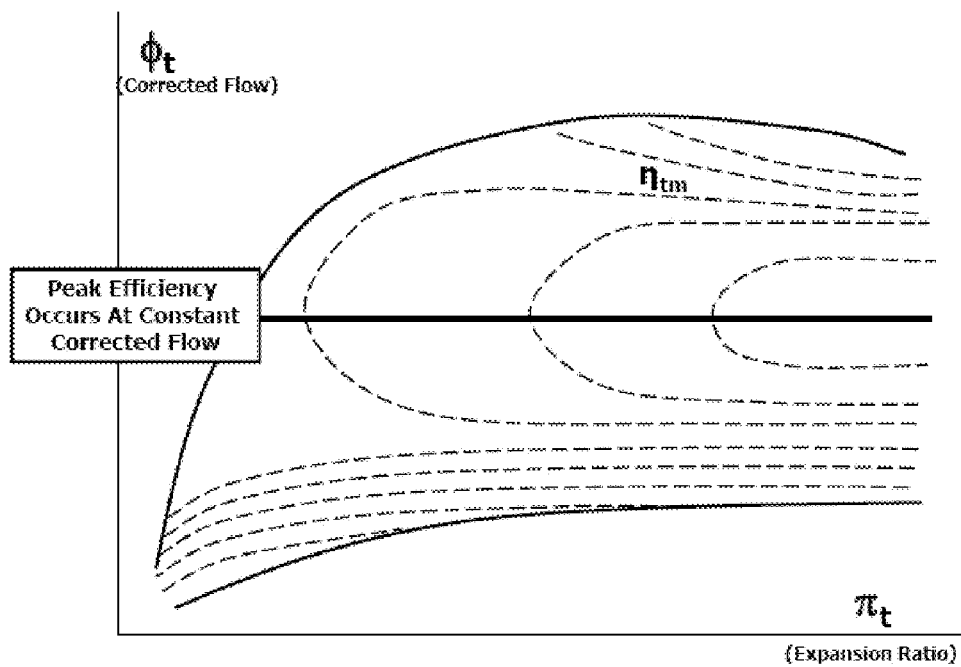
FIG. 3 is a graph of corrected flow with respect to expansion ratio showing variable geometry turbine characteristics.
Figure 4:
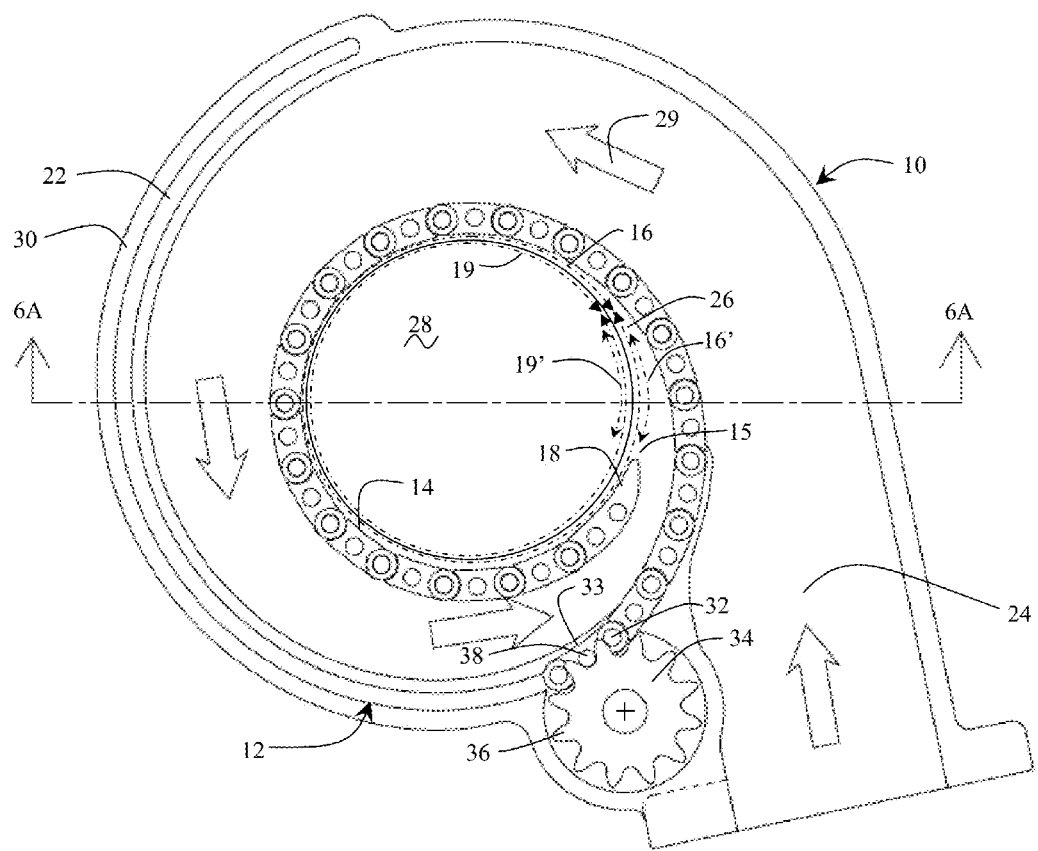
FIG. 4 is a top section view of a volute for a turbine employing a first embodiment of the variable discharge area with the flexible dividing wall substantially closing the turbine inlet.
Figure 5:
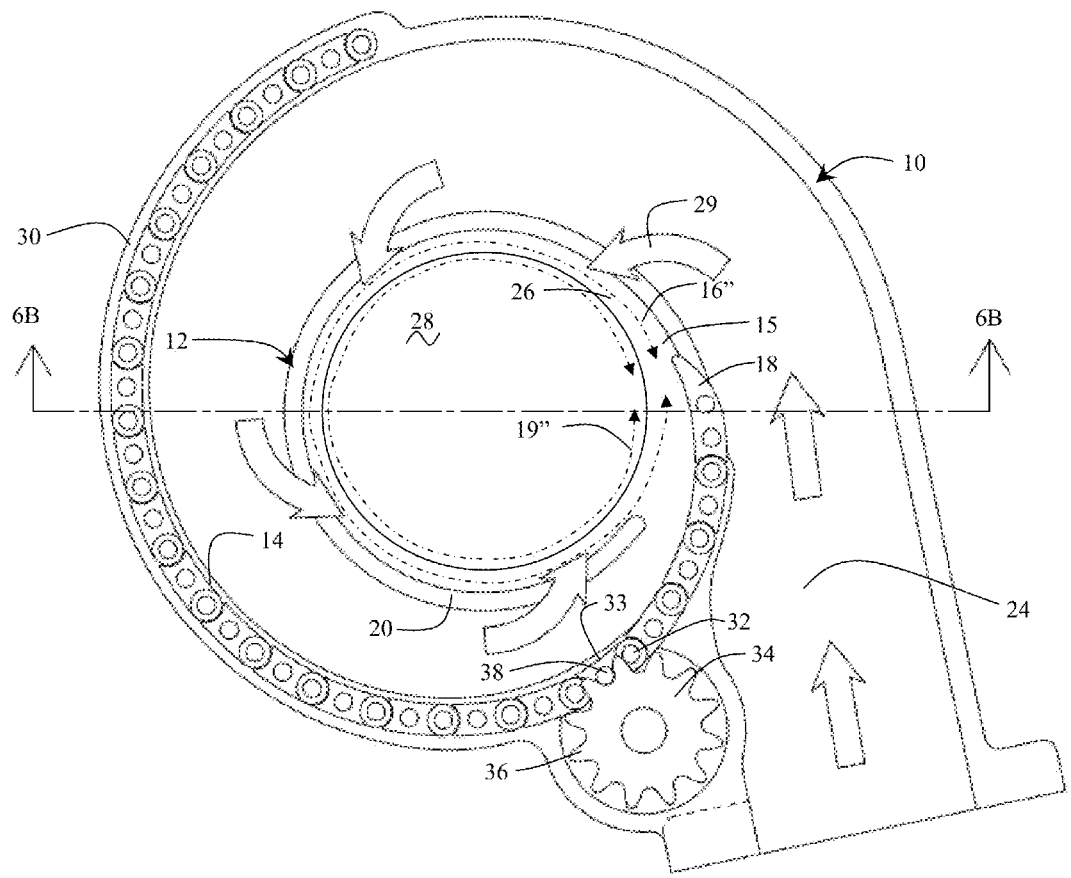
FIG. 5 is a top section view of a volute for a turbine employing the first embodiment of the variable discharge area with the flexible dividing wall substantially open for the entire turbine inlet area.

Referring to the drawings, FIGS. 4 and 5 show a volute 10 having a smooth, continuous passage or track 12 for a flexible dividing wall 14, a link train for the embodiment shown, to be selectively positioned by inserting or withdrawing the link train along the track so that the throat section 15 of the volute discharge area 16 follows an end 18 of the flexible dividing wall, reducing the area and percentage of the periphery of the volute that is discharging flow of exhaust gas carried in the volute into the turbine wheel through the turbine inlet area 19 which constitutes the entire volute discharge area with the dividing wall entirely withdrawn. As shown in the drawings, the dividing wall transitions from tracking around the turbine inlet diameter (inside of the volute) in track portion 20 to tracking to the outside of the volute in track portion 22 at its tail. FIG. 4 shows the mechanism with the link train dividing wall 14 in a mostly closed position making the volute discharge area 16' only a small portion 19' of the total turbine inlet area, where FIG. 5 shows the link train dividing wall in a mostly open or withdrawn position making the volute discharge area 16" a large portion 19" of the total turbine inlet area.

Figure 6A:
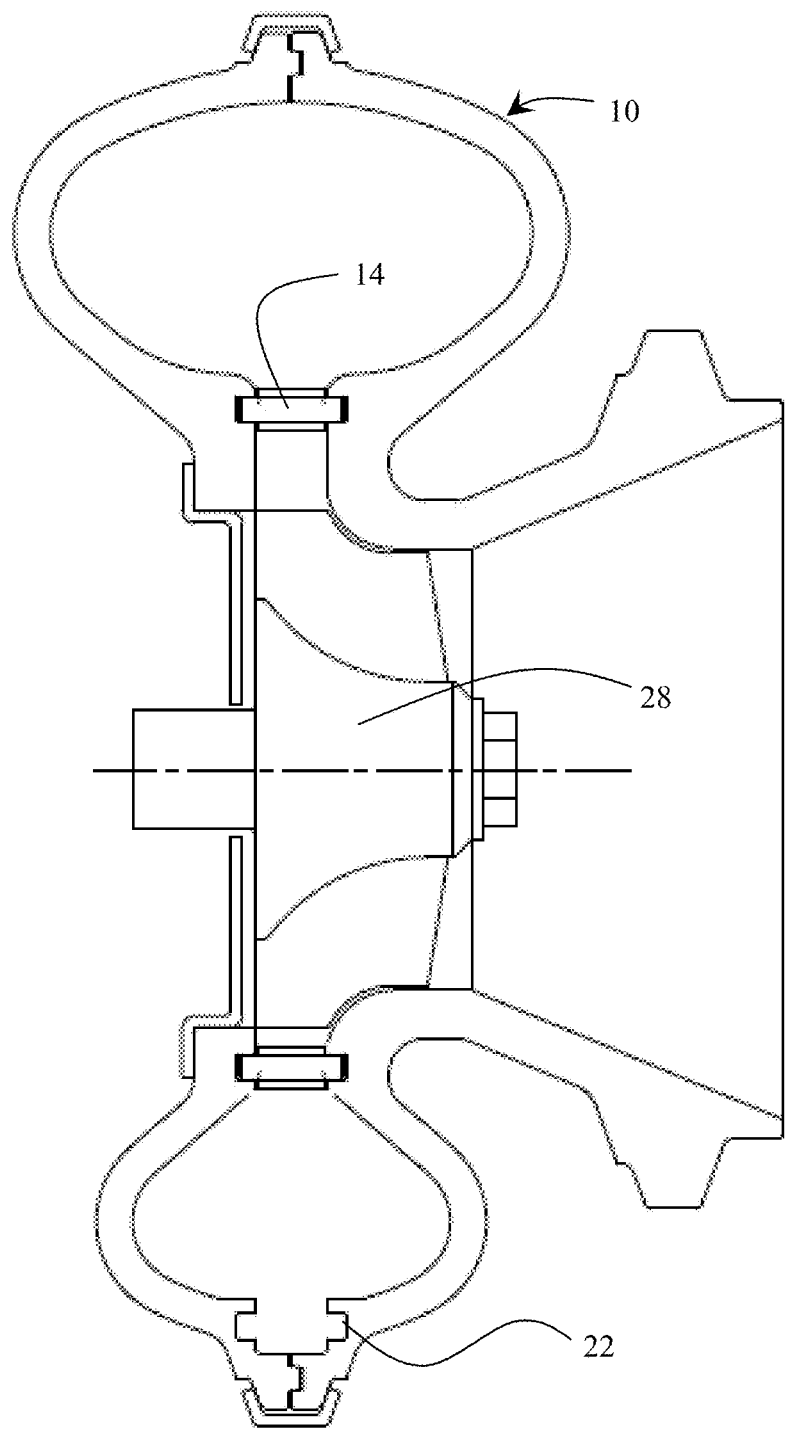
FIG. 6A is a side section view along lines 6A-6A in FIG. 5.
Figure 6B:
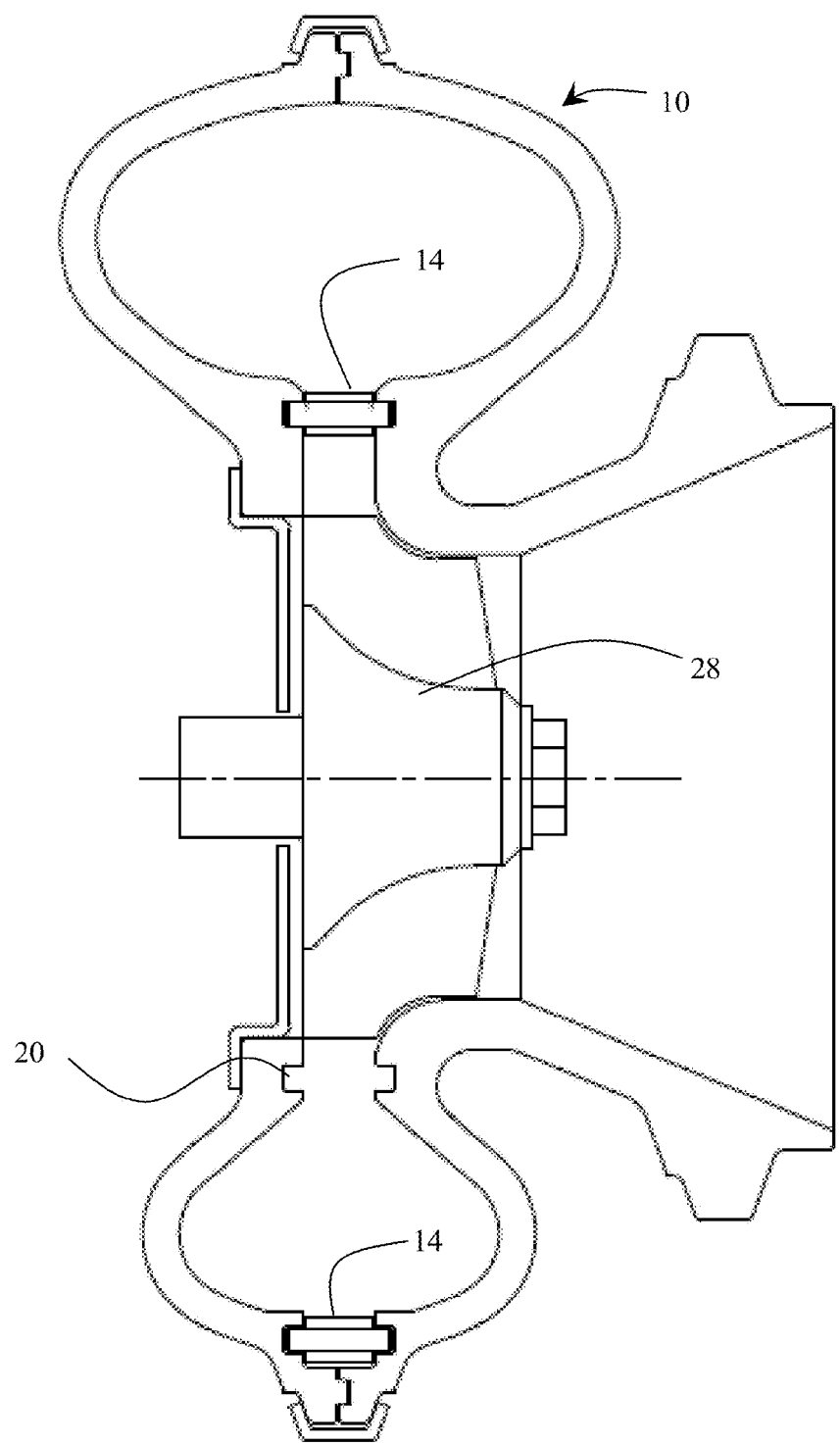
FIG. 6B is a side section view along lines 6B-6B in FIG. 4.

Volute 10 has a spiral shape whose curvature is continuously decreasing as the volute transitions from the fully open design area at the volute inlet 24 to zero at the volute tail 26. The final curvature is slightly larger than the fixed curvature of the diameter of turbine wheel 28 with a predefined clearance. A smooth mathematical curve may define the path along which track 12 transitions from the fixed radius around the wheel to blend into the volute outside wall 30 (best seen in FIGS. 6A and 6B). As one can see from FIGS. 4 and 5, this is smooth, continuous curve which can be followed by a link train or a flexible band acting as the flexible dividing wall. For the embodiment of FIGS. 4, 5 and 6A/B, until the link train dividing wall 12 reaches the volute tail 26, track section 22 contained in a cavity 31 around the outside wall of the volute serves as a storage space for the links that are not providing a dividing surface between the volute discharge area and the turbine inlet area. One can see in FIGS. 6A and 6B, which shows sections of the volute at four different radial cuts, the link train flexible wall 14 at both the active position dividing the volute from the wheel, and the storage position in a cavity on the outside of the volute.

Although one form of links forming the flexible wall are shown in the drawings for this embodiment, different configurations of links or a continuous flexible band are possible. There are advantages of the design as shown, described below.

Figure 6C:
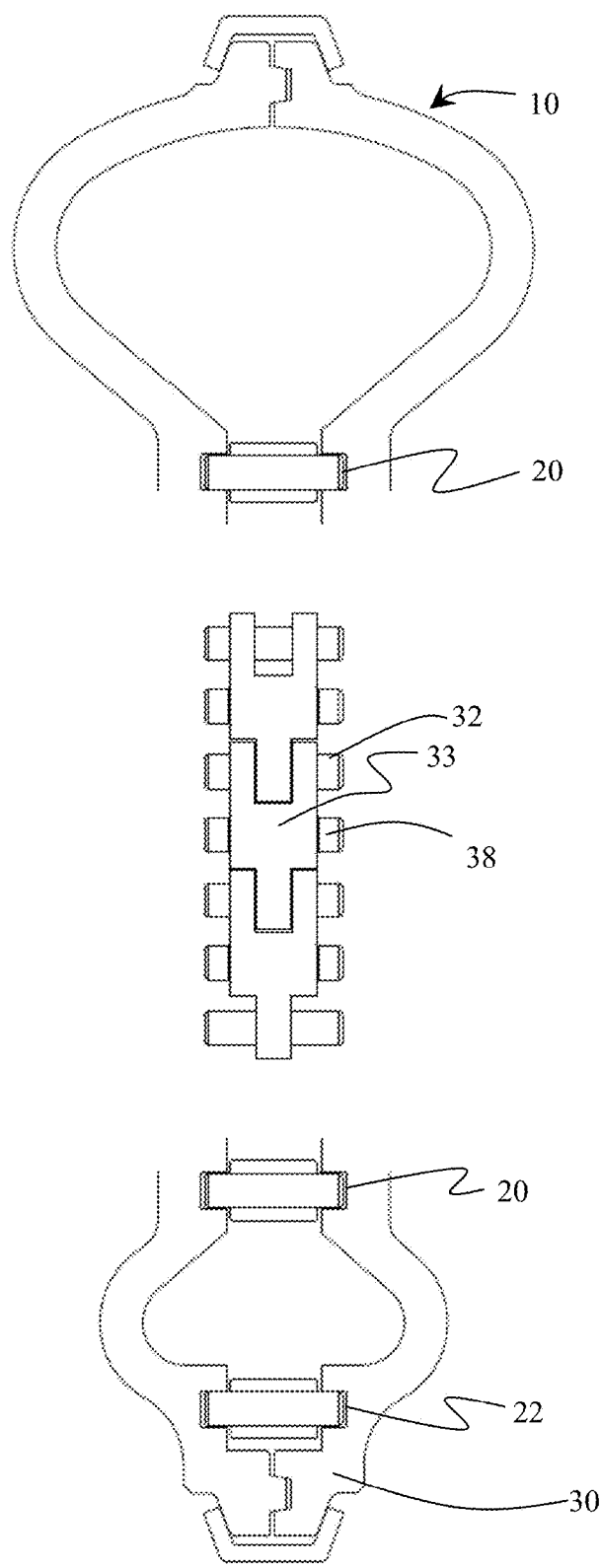
FIG. 6C is a detail view of the links of the flexible dividing wall of the first embodiment shown with a portion of the volute deleted for clarity.

As the volute throat is continually resized for lower volute discharge areas, the result is a more tangential flow vector in the exhaust flowing from the volute inlet into the volute discharge and turbine inlet and the instantaneous flow rate as represented by arrows 29 is maintained at a more constant level into the turbine, albeit to only a portion of the turbine sequentially. Due to the pressure drop in the exhaust flow through the turbine, there will be a pressure differential between the outside area of the flexible dividing wall links (in fluid communication with the volute), and the inside area of the flexible dividing wall links (in fluid communication with the turbine). This will result in a radial force on the links in the direction of the turbine wheel. As there is substantial area for the pressure to work on, the force could be quite large. It is imperative therefore to provide a low friction interface between the links of the flexible dividing wall 14 and track 12 in the inner wall of the volute housing. For the embodiment shown, pins 32 that connect the individual links 33 together also function as rollers lowering the friction of the mechanism. FIG. 6C shows in detail the links 33 of the described embodiment for the flexible dividing wall 14

Due to the fact that the temperatures can be in excess of 600-1000 C depending on the type of engine, lubrication of the mechanism is not possible. In one exemplary embodiment ceramic pins and links are employed to provide a low friction, high hardness, low mass mechanism that is resistant to wear and vibration. The mechanism can also be designed in metal using nickel and/or cobalt alloys.

For the embodiment shown, a double gear 34 is used to actuate the link train, with the gear teeth 36 engaging the rolling pins 32 on the top and bottom of the links as shown in FIG. 4. To reduce the cost of the mechanism, it should be designed with as few links as possible, which means the links should be as long as possible. The effect of this is that the spacing of the teeth for the actuating double gear becomes too large unless a larger diameter gear is employed. However, fixed round projections 38 simulating the connecting pins can be included on the walls of the links. To prevent high friction on the groove, these pins can be smaller than the rolling pins, or have a slight flat molded into the bottom side, keeping them from rubbing on the groove, yet giving a good surface to engage the double gear. Alternative embodiments may employ a rotating segmented rack with each segment having multiple teeth to engage a number of the extending pins simultaneously.

Figure 7:
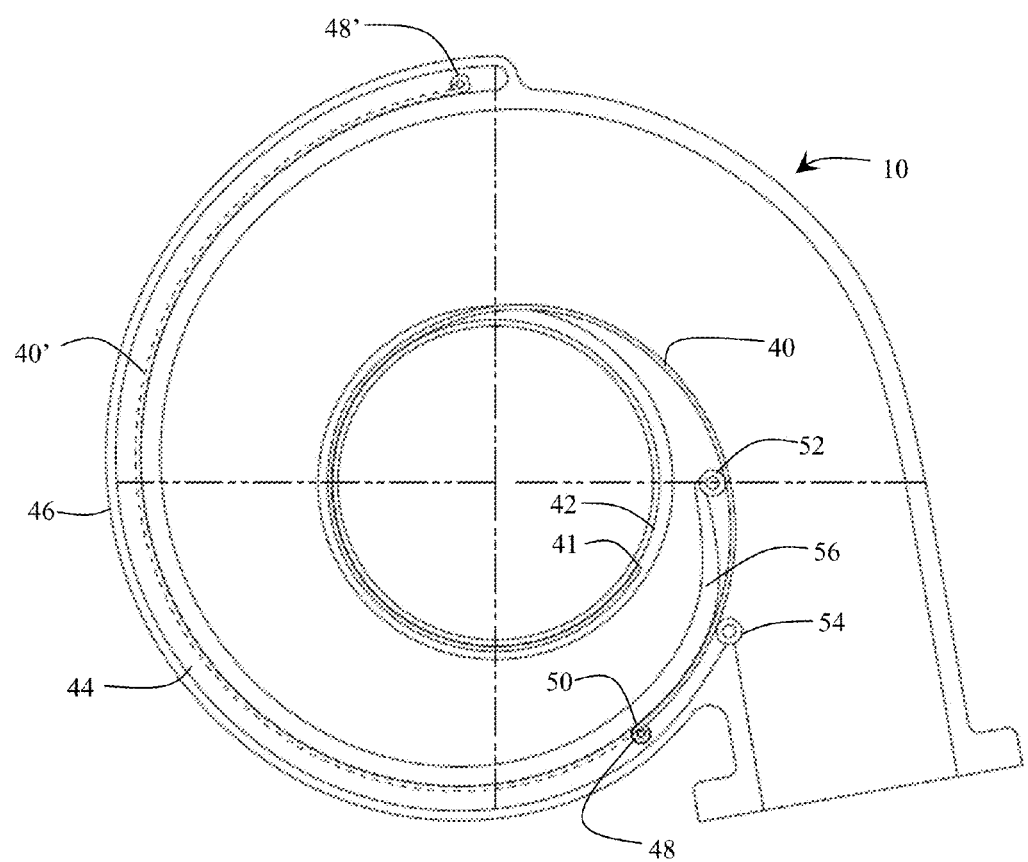
FIG. 7 is a top section view of a volute for a turbine employing a second embodiment of the variable discharge area with the flexible dividing wall substantially closing the turbine inlet.
Figure 8:
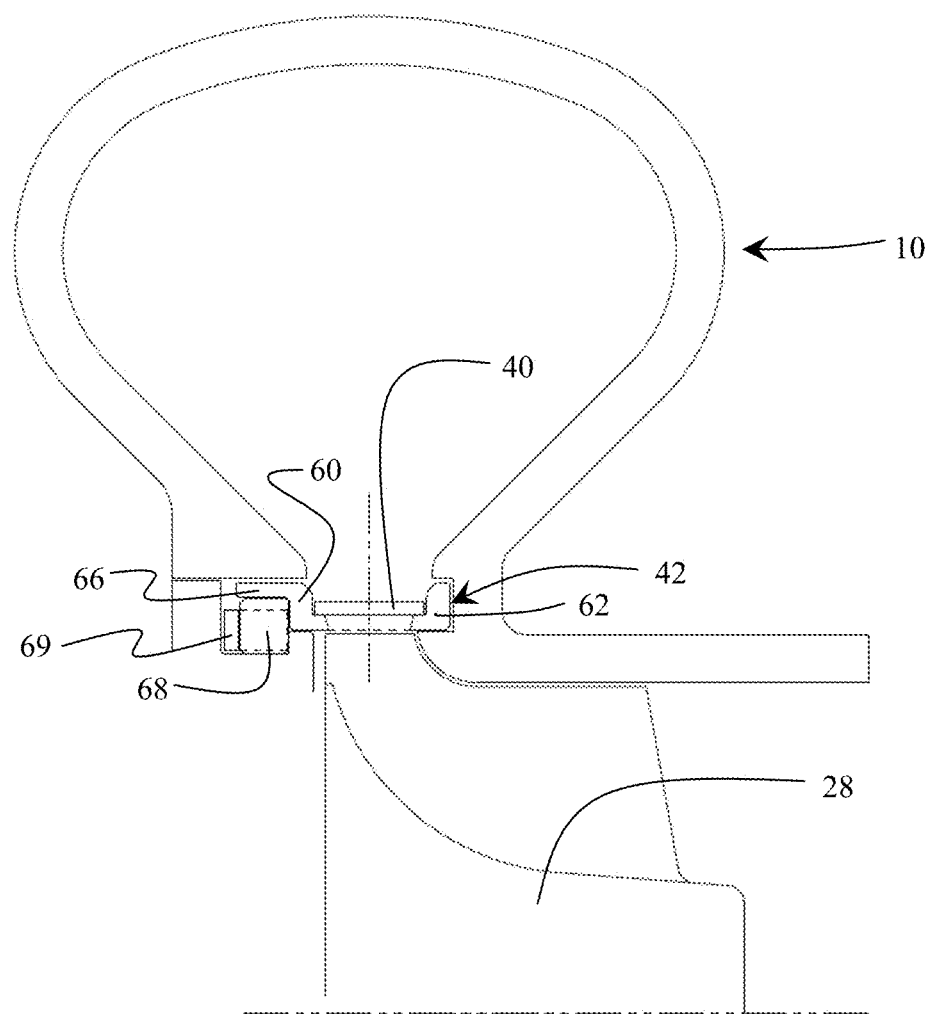
FIG. 8 is a side section view of the volute for the second embodiment of FIG. 7.

FIGS. 7 and 8 show an alternative embodiment employing a resilient band 40 as the flexible dividing wall. For the embodiment shown, a heat-resistant metal strip, such as Inconel about 1.5 mm thick is roll formed into a circular shape slightly larger than the turbine wheel. The band 40 attaches at a first end 41 to a double disk assembly 42 (shown in FIG. 10) which is concentric with the turbine 28. Rotating the double disk assembly covers or uncovers the periphery of the turbine. The band is guided into a slot 44 on the outer wall 46 of volute 10 with a roller 48 attached to a second end 50 of the band and two guide rollers 52, 54 which guide the band across the unsupported space between the double disk and the volute tongue 56. The band is shown in phantom 40' in the fully retracted position with end roller 48' at the slot end. The design is such that the change in the radius of curvature is minimized and the flexibility of the band allows it to deform to meet the shape requirements transitioning from the smaller diameter of the disk assembly to the expanding spiral of the volute outer wall.

Figure 10:
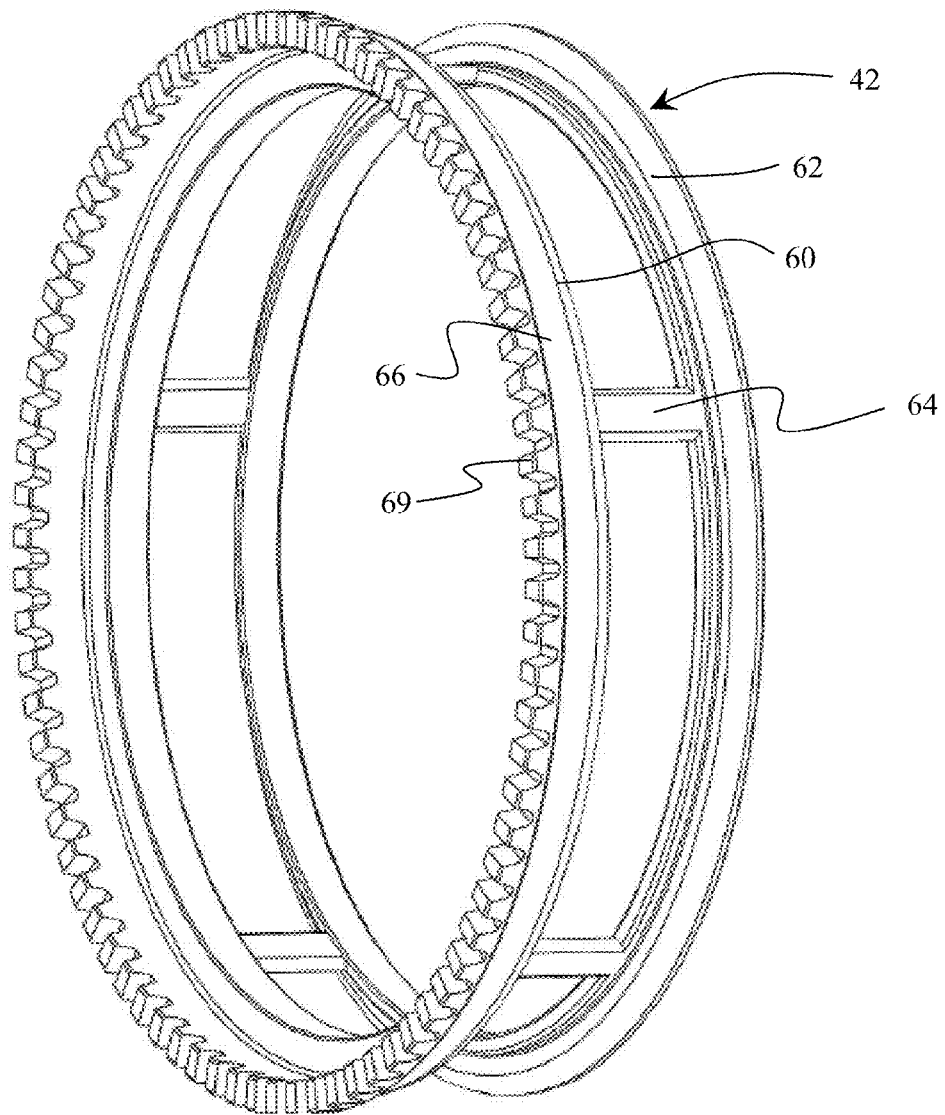
FIG. 10. is an isometric view of the double disk assembly for carriage and actuation of the band.

As seen in FIGS. 8 and 10, the double disk assembly 42 incorporates an outboard disc 60 and an inboard disk 62 connected with spaced ribs 64 to provide an open flow path between the volute discharge area 16 and turbine inlet area 19 when the band is withdrawn. Inboard disk 62 includes a flange 66 for engagement by bearings 68 including a friction wheel or gear drive 69 for rotating the assembly to insert the band into or withdraw the band from the slot.

Figure 9:
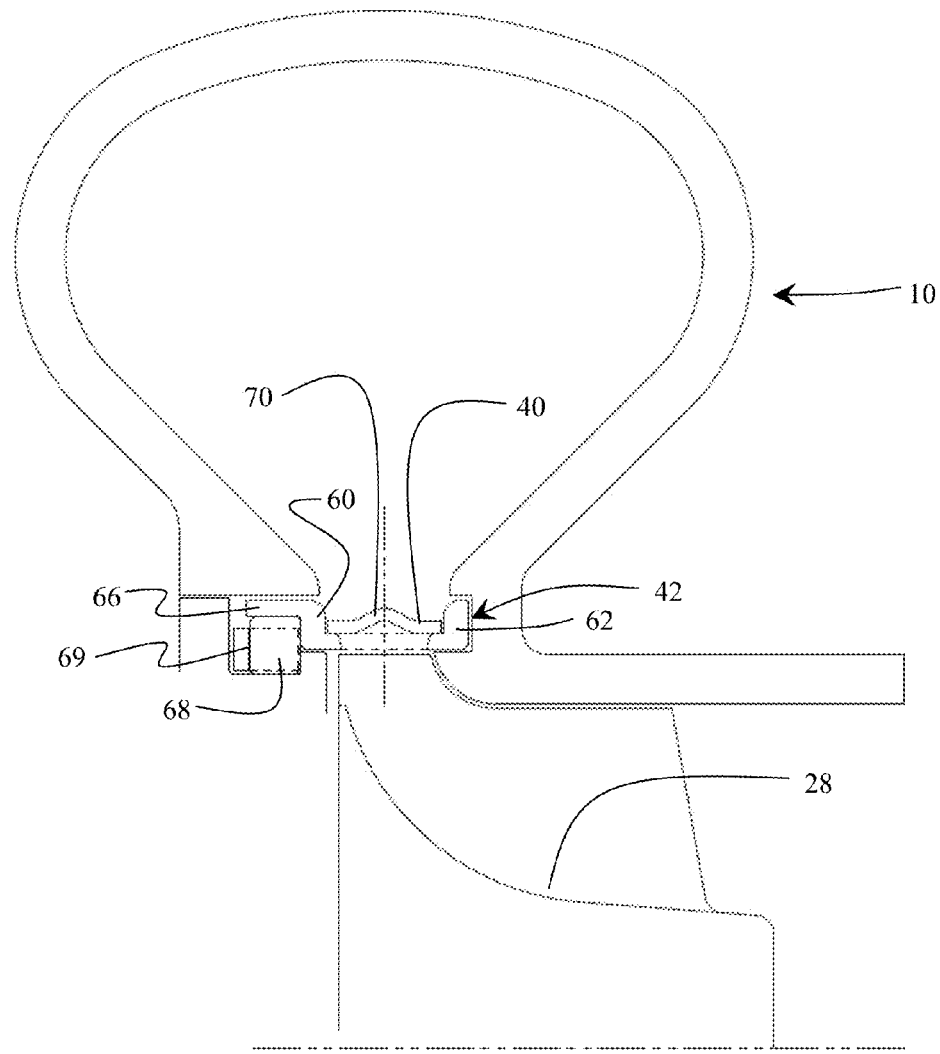
FIG. 9 is a detailed section view of an alternative embodiment of the band for the flexible dividing wall.

As shown in FIG. 9, for an alternative embodiment, the cross section of the band may include a longitudinal dimple or crease 70 for enhanced structural properties in the band.

Figure 11A:
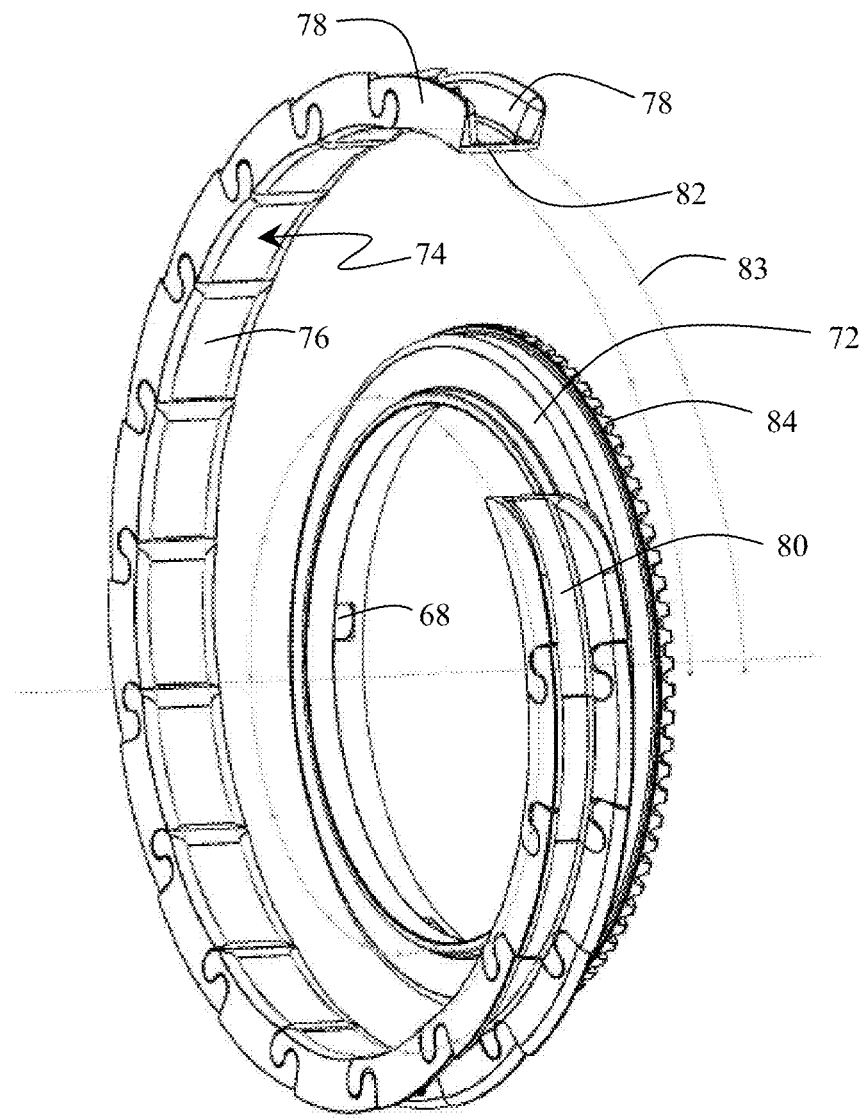
FIG. 11A is a top left isometric view of a second alternative embodiment with a modified link dividing wall.
Figure 11B:
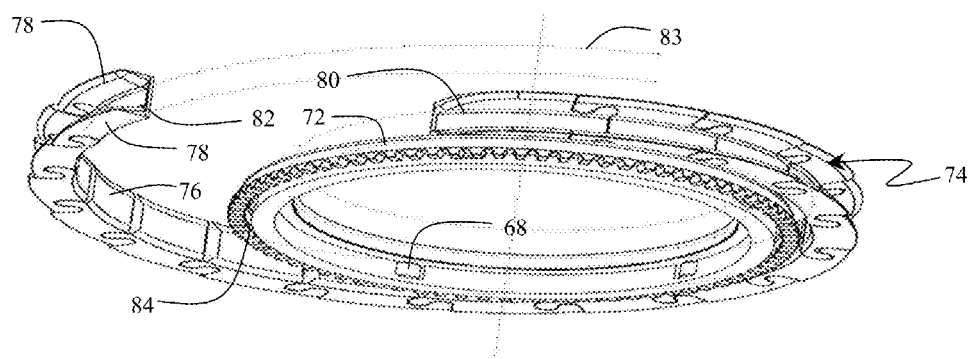
FIG. 11B is a top right isometric view of the second alternative embodiment of FIG. 11A.
Figure 11C:
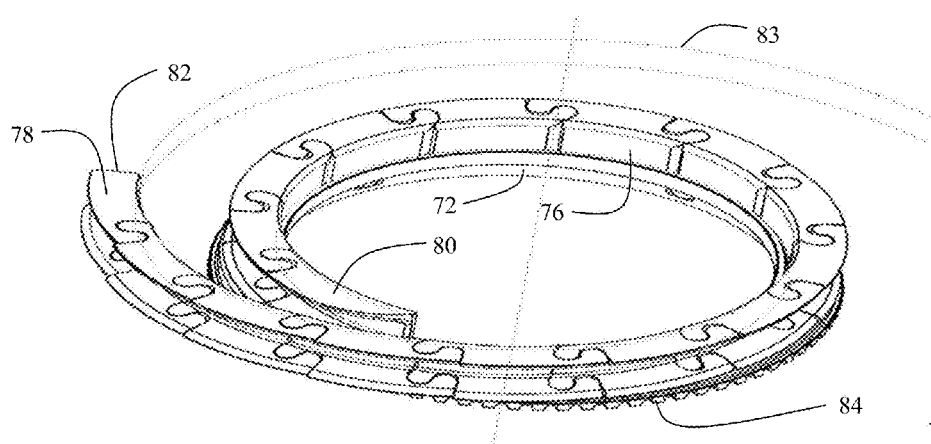
FIG. 11C is a bottom right isometric view of the second alternative embodiment of FIG. 11A.

A second alternative embodiment is shown in FIGS. 11A, 11B and 11C wherein the design of the band and link flexible dividing wall arrangements of the first two embodiments are combined. A drive disc 72 (which may be a single sided element as shown or a double disc as employed with the flexible band of FIGS. 8, 9 and 10) provides an inner track for engagement of a flexible dividing wall created with links 74. The links have a flat wall surface 76 and engaging end surfaces 78 which provide the articulating joints for the links. A trailing link 80 remains in the storage slot 44 in the volute outer wall as shown in FIG. 8 for the band embodiment. A lead link 82 is attached to the drive disk 72 and is wound onto or extracted from the drive disk by rotation of the drive disk. The path followed by the links is shown in phantom as path lines 83. A drive gear 84 provides engagement for a drive sprocket for activation. The self articulating nature of the engaging surfaces 78 between the links eliminates the need for the tongue rollers identified in the band version with the engaging surfaces and flat wall surface carried in sliding engagement with the slot.

Figure 12A:
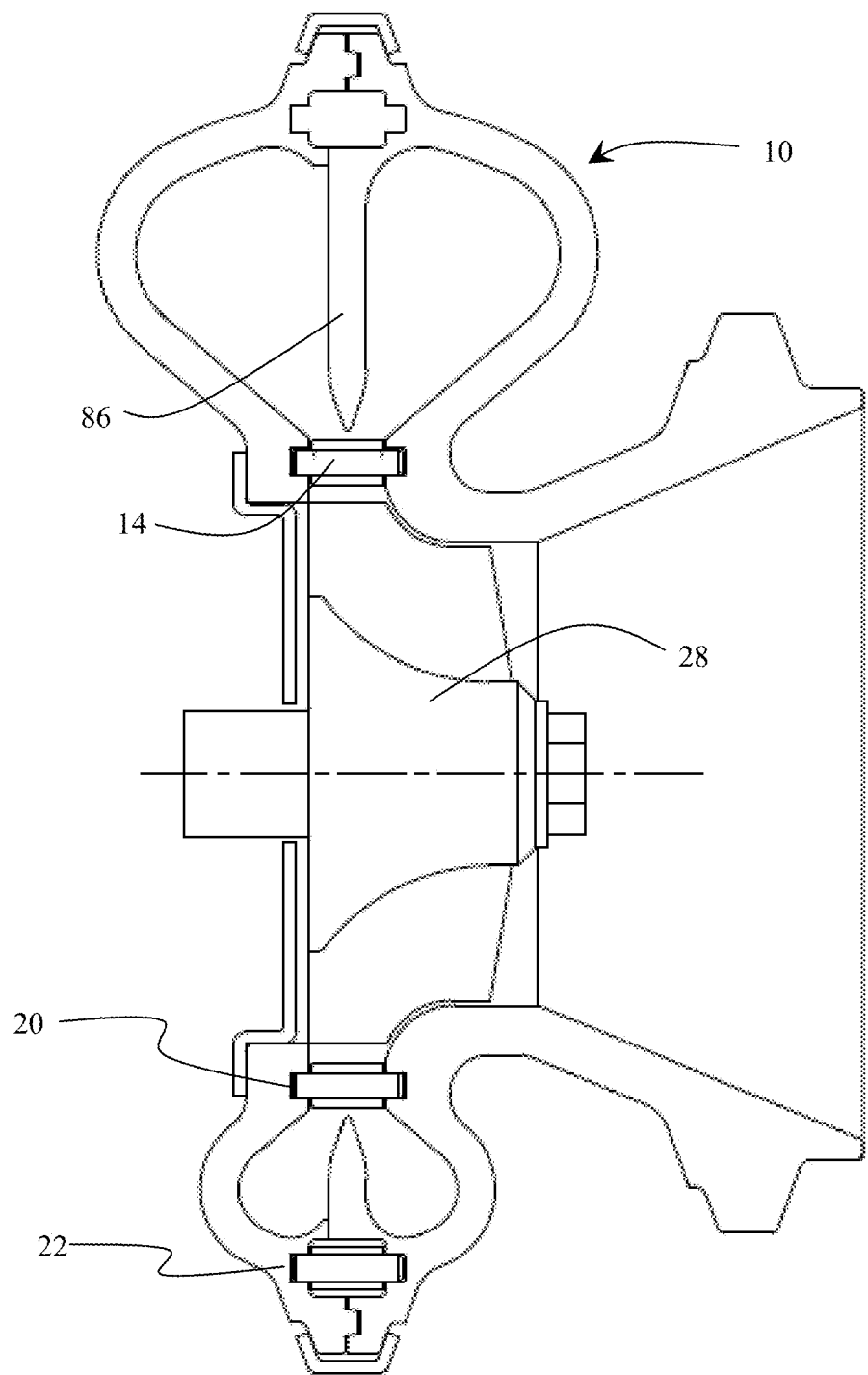
FIGS. 12A and 12B are side section views of a divided wall volute incorporating a flexible link dividing wall.
Figure 12B:
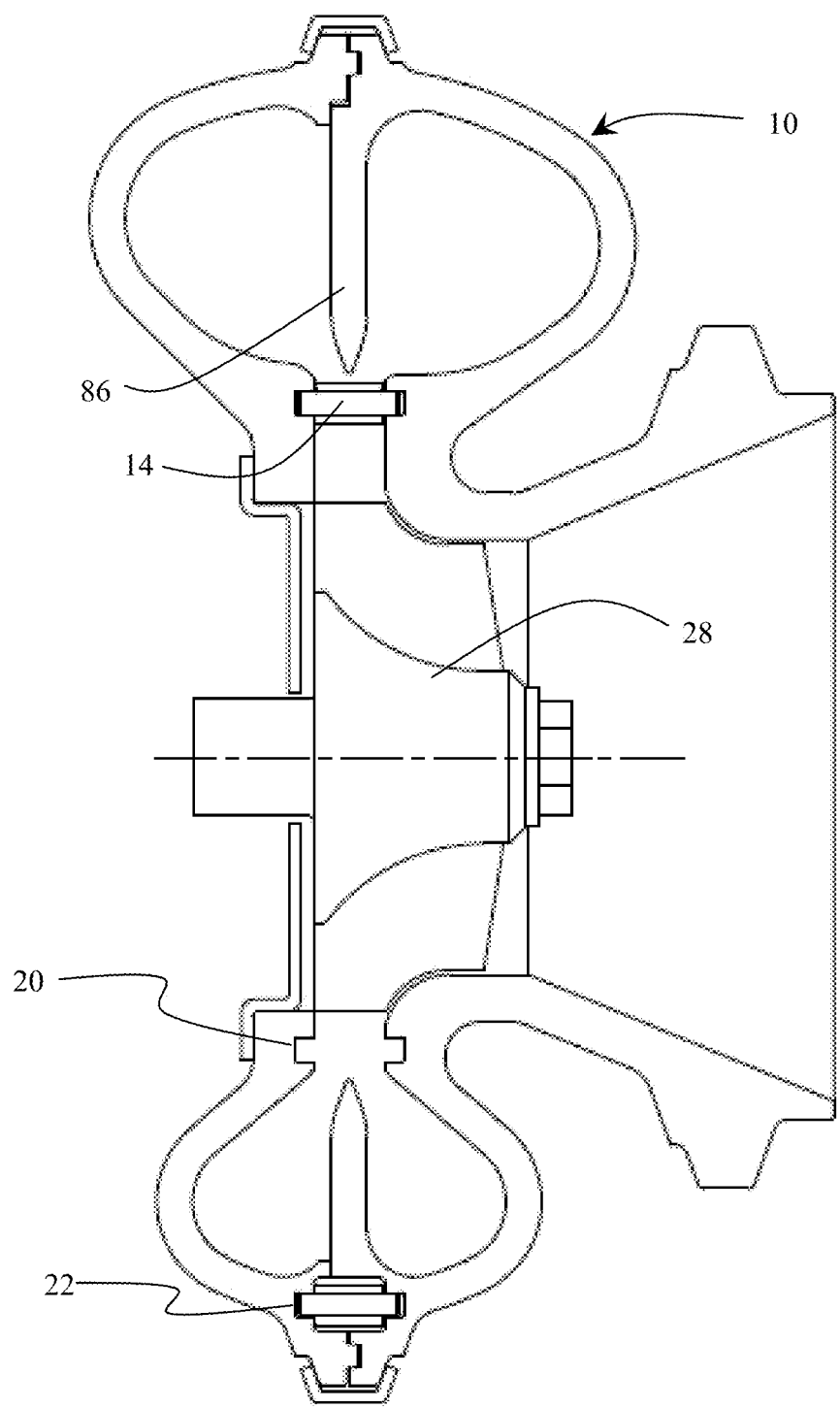

As shown in FIGS. 12A and 12B, a divided turbine can be achieved by using a conventional meridonal divider 86 in the turbine volute housing, keeping the two flow streams separated until entering the turbine wheel. The meridonal divider allows the turbine to take advantage of "pulse charging" and improve the scavenging of cylinders by preventing high pressure pulses traveling upstream in adjacent cylinders. The other elements and functions of the divided volute shown in FIGS. 12A and 12B are comparable to the undivided volute shown in FIGS. 6A and 6B.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:
1. A variable inlet area turbine comprising:
  a volute having a discharge area for flow of exhaust gas carried in the volute into a turbine inlet area; and
  a flexible dividing wall having an end and movable along a path defined adjacent the turbine inlet area and transitioning in a smooth curve into an outer wall of the volute, said dividing wall selectively positionable by insertion and withdrawal along the path to vary the discharge area from substantially closed to substantially open.

2. The variable inlet area turbine as defined in claim 1 wherein the flexible dividing wall comprises a link train and said path comprises a track substantially surrounding the turbine inlet area and transitioning to the outer wall of the volute, said link train being withdrawn along said track on the outer wall to open the discharge area.

3. The variable inlet area turbine as defined in claim 2 wherein the link train incorporates pins connecting links and extending into the track and further comprising a gear engaging the pins and rotatable to insert and withdraw the link train along the track.

4. The variable inlet area turbine as defined in claim 3 wherein the link train further incorporates projections on the links intermediate the pins for engagement by the gear.

5. The variable inlet area turbine as defined in claim 3 wherein the pins are rotatable for low friction engagement of the track.

6. The variable inlet area turbine as defined in claim 1 wherein the flexible dividing wall comprises a flexible band and further comprising:
a rotatable double disk assembly surrounding the turbine inlet, a first end of said band attached to the rotatable double disc assembly, said rotatable double disk assembly comprising a first portion of the path;
said volute having an outer wall with a slot receiving the band as a second portion of the path.

7. The variable inlet area turbine as defined in claim 6 wherein the flexible band further has a second end with a roller received in the slot.

8. The variable inlet area turbine as defined in claim 6 further comprising a roller set positioned on a tongue of the volute to engage the band for structural support across a third unsupported portion of the path intermediate the first and second portions.

9. The variable inlet area turbine as defined in claim 6 wherein the double disk assembly comprises an inboard disk and an outboard disc carried by spaced ribs and the inboard disk further includes a flange supported by a bearing system.

10. The variable inlet area turbine as defined in claim 9 wherein the bearing system includes a drive wheel for rotation of the double disk assembly.

11. The variable inlet area as defined in claim 1 wherein the volute incorporates a meridonal divider.

12. A variable inlet area turbine comprising
a volute having a discharge area for flow of exhaust gas carried in the volute into a turbine inlet area;
a track circumscribing a path intermediate the volute discharge area and turbine inlet area, substantially encircling the turbine inlet area and extending into a cavity on an outside wall of the volute;
a link train carried in the track and positionable from a first substantially closed position surrounding the turbine inlet area to a second substantially open position with the link train withdrawn into the cavity.

13. The variable inlet area turbine as defined in claim 12 wherein the link train incorporates pins connecting links and extending into the track and further comprising a gear engaging the pins and rotatable to insert and withdraw the link train along the track.

14. The variable inlet area turbine as defined in claim 13 wherein the link train further incorporates projections on the links intermediate the pins for engagement by the gear.

15. The variable inlet area turbine as defined in claim 13 wherein the pins are rotatable for low friction engagement of the track.

16. A variable inlet area turbine comprising:
a volute having a discharge area for flow of exhaust gas carried in the volute into a turbine inlet area;
a flexible wall removably carried by a rotatable double disk assembly surrounding the turbine inlet, a first end of said band attached to the rotatable double disc assembly;
said volute having an outer wall with a slot receiving the wall, said wall positionable from a first substantially closed position on the double disk assembly surrounding the turbine inlet area to a second substantially open position with the band withdrawn into the slot.

17. The variable inlet area turbine as defined in claim 16 wherein the flexible wall is a band and said band further has a second end with a roller received in the slot.

18. The variable inlet area turbine as defined in claim 16 further comprising a roller set positioned on a tongue of the volute to engage the band for structural support across a third unsupported portion of the path intermediate the first and second portions.

19. The variable inlet area turbine as defined in claim 16 wherein the double disk assembly comprises an inner disk and an outer disc carried by spaced ribs and the inner disk further includes a flange supported by a bearing system.

20. The variable inlet area turbine as defined in claim 16 wherein the flexible wall is a joined link assembly.

\* \* \* \* \*